United States Patent [19]
Long et al.

[11] Patent Number: 5,835,958
[45] Date of Patent: Nov. 10, 1998

[54] METHOD AND APPARATUS FOR DYNAMICALLY SIZING NON-CONTIGUOUS RUNTIME STACKS

[75] Inventors: Dean R. E. Long, Boulder Creek; Alan G. Bishop; Nedim Fresko, both of Campbell, all of Calif.

[73] Assignee: Sun Microsystems, Inc., Palo Alto, Calif.

[21] Appl. No.: 740,445

[22] Filed: Oct. 29, 1996

[51] Int. Cl.$^6$ .................................................. G06F 12/00
[52] U.S. Cl. .................. 711/170; 711/171; 711/172; 711/132; 711/165; 711/209; 395/674; 395/621; 707/205
[58] Field of Search ..................... 395/673, 589, 395/569, 653, 705, 568; 711/2, 200, 132

[56] References Cited

U.S. PATENT DOCUMENTS

| | | | |
|---|---|---|---|
| 4,084,228 | 4/1978 | Dufond et al. ........................ | 395/673 |
| 4,445,170 | 4/1984 | Hughes et al. ......................... | 711/2 |
| 4,454,580 | 6/1984 | Page et al. ............................ | 395/589 |
| 4,524,416 | 6/1985 | Stanley et al. ........................ | 711/200 |
| 4,530,049 | 7/1985 | Zee ....................................... | 711/132 |
| 4,951,194 | 8/1990 | Bradley et al. ........................ | 711/132 |
| 4,969,091 | 11/1990 | Muller ................................... | 395/569 |
| 5,043,870 | 8/1991 | Ditzel et al. .......................... | 711/132 |
| 5,107,457 | 4/1992 | Hayes et al. ....................... | 364/DIG. 1 |
| 5,452,456 | 9/1995 | Mourey et al. ........................ | 395/653 |
| 5,487,158 | 1/1996 | Amelina et al. ....................... | 395/705 |
| 5,490,256 | 2/1996 | Mooney et al. ........................ | 395/568 |

*Primary Examiner*—Tod R. Swann
*Assistant Examiner*—Fred F. Tzeng
*Attorney, Agent, or Firm*—Beyer & Weaver, LLP

[57] ABSTRACT

A method, apparatus, and software for efficiently allocating discontiguous stack space without requiring compiler changes are described. In one aspect, a method is provided for executing a compiled function that is located in a first computer memory stack chunk such that additional memory is allocated efficiently if a determination is made that such additional memory is necessary for execution of the compiled function. In one embodiment, the method includes calling a stack checking function that includes the compiled function. A determination is made if additional memory is required for executing the compiled function. If no additional memory is required, then the compiled function is called and executed. However, if additional memory is necessary, then additional memory is allocated that is discontiguous with the original memory stack.

24 Claims, 6 Drawing Sheets

METHOD AND APPARATUS FOR DYNAMICALLY SIZING NON-CONTIGUOUS RUNTIME STACKS

BACKGROUND OF THE INVENTION

1. Field of Invention

The present invention relates generally to software, methods, and apparatus for use in allocating computer memory, and, more particularly, to software, methods, and apparatus for dynamically allocating non-contiguous memory stack space.

2. Background

A running program, or a thread, of a computer system often requires stack space associated with random access memory (RAM) to store arguments and local variables used by a running program. A program will generally include a "call chain," or a series of function calls. Each function within a call chain generally has a "frame," e.g., page or area, of memory on a stack. As the depth of a call chain increases, the amount of stack space that is required also increases. That is, the amount of stack memory required by a program increases as the depth of function calls made by the program increases.

One method that is generally used to allocate stack space involves the static allocation of a contiguous piece of physical memory that is large enough for all expected call chains. While a large, contiguous piece of physical memory serves the purpose of providing enough stack space for all expected call chains, allocating a large amount of physical memory can waste stack space, as call chains will rarely use the entire stack allocated to them. Since the amount of physical memory associated with a computer system is generally limited, reserving a large amount of physical memory for a particular call chain often proves to be an inefficient use of system resources.

Dynamically sizing a stack such that the size of the stack changes to accommodate the immediate needs of a program can result in substantial memory savings. A common approach to dynamically sizing, or "growing," a stack involves the use of virtual memory protection. A stack which utilizes virtual memory protection is contiguous in virtual (logical) memory but not necessarily in physical memory. In general, when a stack grows to the point where access is required to a protected page or frame which has not been previously accessed, a fault is generated. After the fault is generated, physical memory which corresponds to the page in virtual memory may be allocated such that execution of a program using the physical memory associated with the page may occur. While a stack which has virtual memory protection grows dynamically to accommodate particular call chains, such a stack does not always return stack pages, e.g., physical memory that corresponds to the stack pages, to the computer system once the pages are no longer needed. Hence, such an approach often proves to be an inefficient use of physical memory, as once additional stack space is dynamically allocated for a given function, the additional stack space may remain allocated for that function regardless of whether the additional stack space will be needed again.

Non-contiguous stacks are typically used when there is not enough available hardware to support virtual memory. These stacks are sometimes also used to reduce the inefficient allocation of physical memory. The use of stacks which can grow in non-contiguous memory typically involves changing the compiler used to compile a program, and, hence, functions related to the program, such that the compiler generates additional code in the program and related functions that check for stack overflow. This additional code is considered to be special function prologue, or epilogue, code, and is added to each function compiled using the modified compiler. In some cases, adding checks for stack overflow to a function is unnecessary and, therefore, inefficient, as some functions will never need additional stack space.

In the event that stack overflow is either detected or appears to be imminent for a given function, code is executed to allocate a new stack chunk, e.g., a stack portion which is non-contiguous with respect to the "current" stack. Once the new stack chunk is allocated, the execution of the function which required the new stack chunk continues on the new stack. When the new stack chunk is no longer needed, the new stack chunk may be returned to the overall computer system. However, while stacks which grow in non-contiguous memory can be dynamically allocated and may readily be returned to the overall computer system when they are no longer required, compiler changes which are used to enable such stacks are typically complicated. Further, as compilers are generally platform specific, compilers associated with each platform on which non-contiguous stacks are to be implemented must be modified to include the additional code as previously mentioned.

Thus, what is needed is efficient, platform-independent software, methods, and apparatus for allocating additional stack space to functions on an as-needed basis or when there is insufficient hardware to support virtual memory without requiring new compilers.

SUMMARY OF THE INVENTION

The present invention addresses the above-described difficulties in allocating additional stack space by providing, in one aspect, a method, apparatus, and software for efficiently allocating discontiguous stack space without requiring compiler changes.

In one aspect of the invention, a method is provided for executing a compiled function that is located in a first computer memory stack chunk such that additional memory is allocated efficiently if a determination is made that such additional memory is necessary for execution of the compiled function. In one embodiment, the method of the invention includes calling a stack checking function that includes the compiled function. A determination is made if additional memory is required for executing the compiled function. If no additional memory is required, then the compiled function is called and executed. However, if additional memory is necessary, then additional memory is allocated that is discontiguous with the original memory stack.

In one embodiment, the step of allocating additional memory includes allocating a second memory stack chunk for the compiled function. In another embodiment, a buffer frame function is called that is configured to create a transparent boundary between the first and second stack chunks. A trampoline function is also called to call the compiled function in the second stack chunk. In other embodiments, stack protection locks are engaged and released with respect to the second stack chunk.

In another aspect, the present invention includes computer-readable media containing computer-readable program code devices for allocating additional computer memory stack space for executing a compiled function located in a first computer memory stack chunk. In one embodiment, the computer-readable medium comprises computer program code devices configured to cause a computer to execute the steps of the above-described method.

In still another aspect, the present invention includes a computer system configured to allocate additional computer memory stack space for executing a compiled function located in a first computer memory stack chunk. In one embodiment, the computer system of the invention includes computer memory configured to store at least one compiled computer function for execution. The computer memory is further configured to be arranged into at least one memory stack space having at least one memory stack chunk. A stack checking function generator is provided that is effective to adapt the compiled function to form a stack checking function. Further, a memory manager is provided that is effective to execute the stack checking function and determine if additional memory is required to execute the compiled function.

In one embodiment, the memory manager is configured to allocate a second stack chunk if the memory manager determines that additional memory is required for executing the compiled function. In another embodiment, the memory manager is adapted to create a buffer frame in the memory stack space which buffer frame is adapted to create a transparent boundary between the first and second stack chunks. In still another embodiment, if it is determined that a long-jump occurred the memory manager is adapted to clean-up stack chunks allocated above the first stack chunk that are not in use, and return those stack chunks for re-allocation.

These, and other aspects and advantages of the present invention, will become apparent when the Description below is read in conjunction with the accompanying Drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE DRAWINGS

Certain embodiments of a method and apparatus for dynamically allocating stack space will be described below making reference to the accompanying drawings.

Figure 1A:
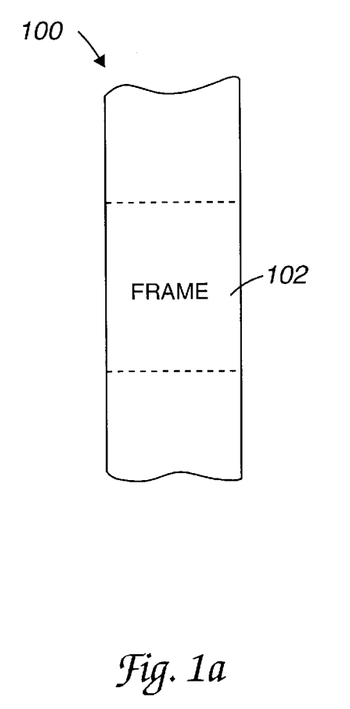
FIG. 1a is a diagrammatic representation of a computer stack.
Figure 2A:
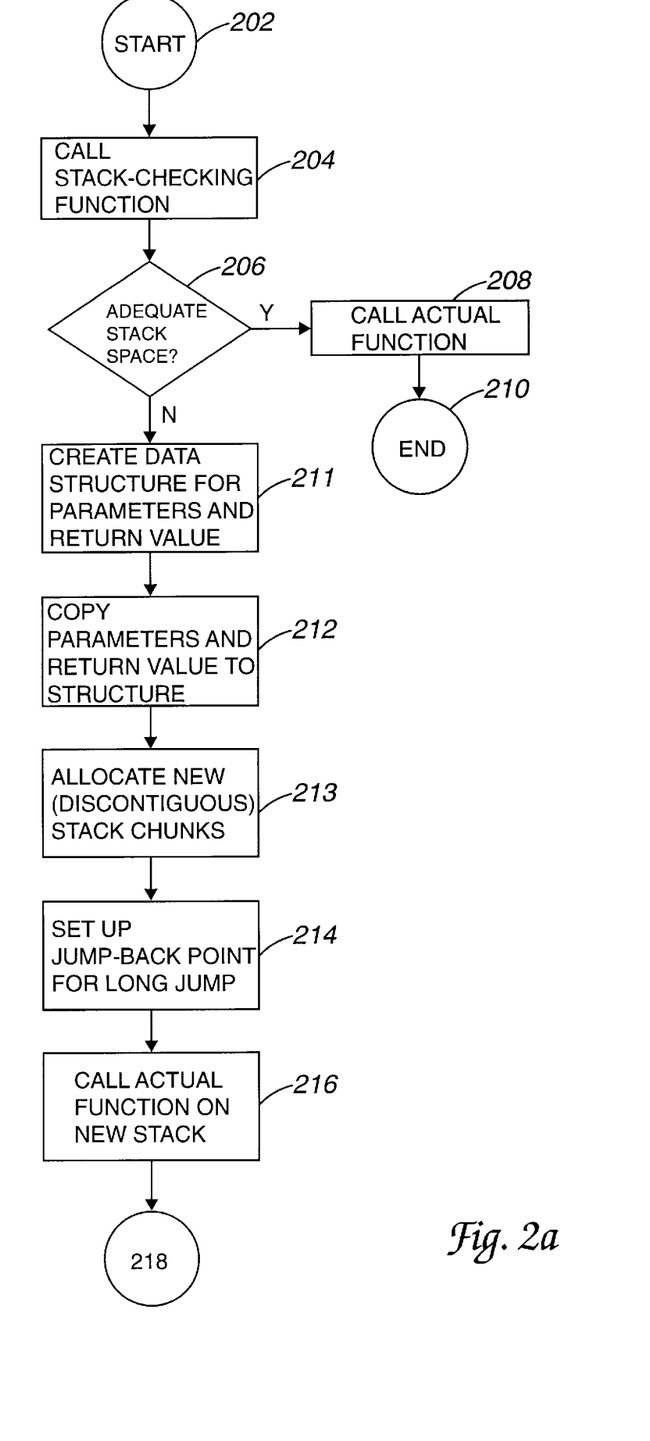
FIGS. 2a and 2b are a process flow diagram which illustrates the steps associated with a function which includes a check for stack overflow in accordance with an embodiment of the present invention.
Figure 2B:
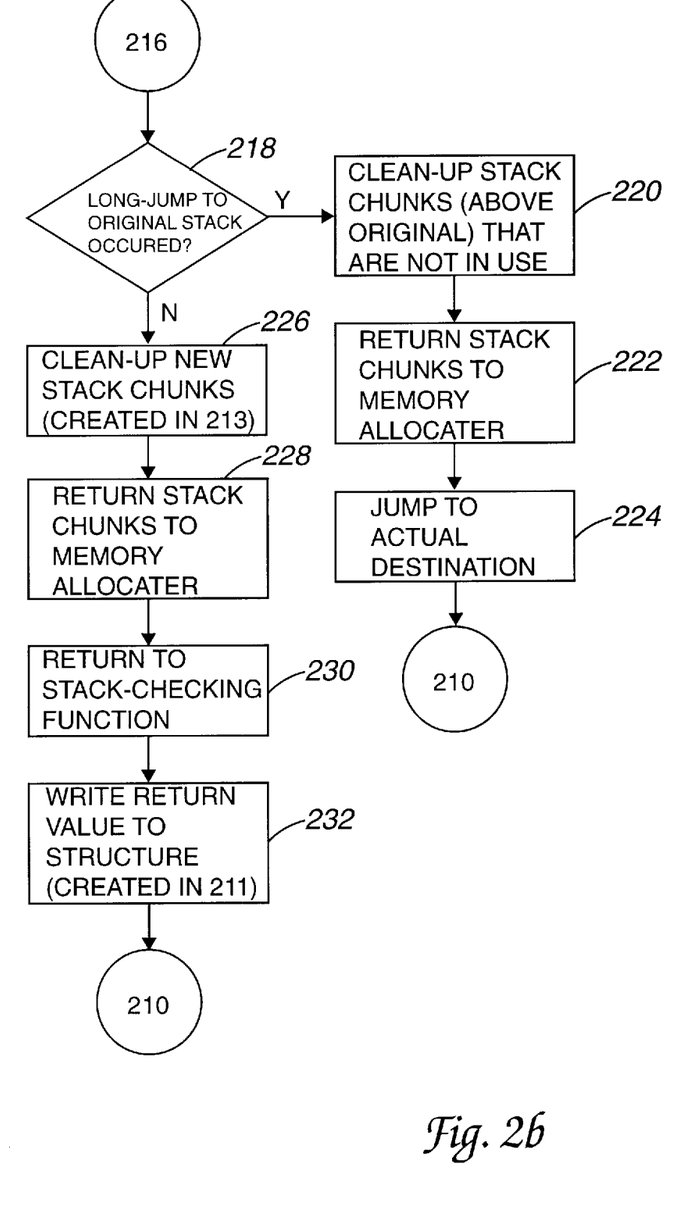

An illustration of a computer stack is provided in FIG. 1a. A computer stack, or stack chunk, 100 is generally a portion of computer memory associated with a computer system. Stack chunk 100 is ordinarily located in the random access memory (RAM) of a computer system, and may be considered to be a list of data contained in frames, as for example frame 102. Stack chunk 100 may include any number of frames, or pages, depending upon the number of functions in a call chain associated with stack chunk 100. Frame 102 is a region of memory on stack chunk 100 which contains data, as for example local variables, that relate to a particular function. By way of example, frame 102 may include local variables associated with a stack-checking function, e.g., frame 102 may be a stack-checking function frame, as will be described below with respect to FIG. 2.

Stack chunk 100, as originally allocated by the computer system, is of a certain size. The allocation of memory to stack chunk 100 may depend upon the expected size of a "call chain," or a series of function calls. Alternatively, the size of stack chunk 100 may be constrained by the amount of contiguous memory available. When a function call chain is executed, each function associated with the call chain will utilize an associated frame on stack chunk 100 until either all originally allocated, e.g., contiguous, stack space is used, or the usage of all originally allocated stack space is imminent. When stack chunk 100 requires more memory, non-contiguous memory may be allocated to stack chunk 100.

Figure 1B:
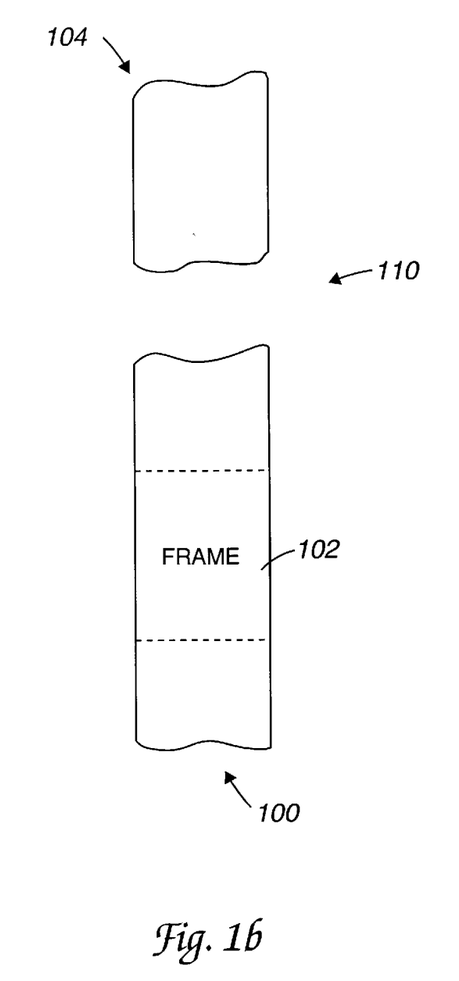
FIG. 1b is a diagrammatic representation of a non-contiguous computer stack.

FIG. 1b is a diagrammatic representation of a non-contiguous stack, or a stack which exists in non-contiguous memory. Stack chunk 100, as described above with respect to FIG. 1a, includes any number of frames. However, when more memory than originally allocated to stack chunk 100 is required, a non-contiguous portion of memory 104, also located in RAM, may be allocated to stack chunk 100. Stack chunk 100, together with non-contiguous portion of memory 104, which is also considered to be a stack chunk, form an overall stack 110.

While a program may be arranged such that each function that is a part of the program calls a stack-checking function, i.e., a function which is used to determine whether additional memory should be set aside for a stack, checking each function that is a part of a call chain of a program is often inefficient. As some functions will tend never to need additional memory, checking all functions to determine if an additional stack chunk should be allocated is unnecessary. Any suitable method may be used to make a determination regarding which call chains and functions are likely to require the allocation of additional stack space. Functions within the call chains which are likely to require additional stack space can then be altered to include a call to a stack-checking function. That is, checks for whether enough stack space may be needed can be added in specific functions in order to reserve memory for the call chain with which the functions are associated. Specifically, functions within a call chain which is likely to require a stack to grow may be replaced by a stack-checking function that performs a check on the remaining stack space available. It should be appreciated that these functions may serve as "hooks," or access points, to different call chains.

In one embodiment, the stack-checking function may be wrapped with other code to form a wrapper function. By checking the remaining stack space available only for call chains which are likely to need more stack space, the inefficiency associated with checking all functions is greatly reduced. Further, by using stack-checking functions in lieu of recompiling all functions such that all functions include stack-checking code, the complications attributed to modifying compilers such that the compilers generate extra stack-checking code are relieved.

Referring next to FIGS. 2a and 2b, a method of executing a function which may potentially require the allocation of a non-contiguous stack space will be described in accordance with an embodiment of the present invention. The process of executing an "actual" function, i.e., a compiled function which is part of a call chain associated with a program, begins at 202, and in a step 204, a stack-checking function is called. In one embodiment, the stack-checking function is part of a wrapper function for the actual, or target, function. It should be appreciated that in the event that the actual function was originally called with parameters, or arguments, then the stack-checking function will be called with the same parameters. In general, a stack-checking function is constructed using information that pertains to the actual function with which the stack-checking function is associated. In one embodiment, the size of a stack required by the actual function is used, in conjunction with macros, to create the wrapper function for the actual function.

In a step 206, a determination is made regarding whether the stack space that is currently available is adequate for the execution of the actual function. The determination may entail a check to determine if there is adequate stack space for the execution of the actual function as well as all of the functions which may be called by the actual function. If the determination is that no additional stack space is to be allocated, then process flow proceeds to a step 208 in which the actual function is called. After the actual function is called, the process of executing the actual function ends at 210.

If the determination in step 206 is that adequate stack space does not exist, then process flow proceeds to a step 211 in which a data structure is created to hold any arguments, or parameters, passed into the call to the stack-checking function. The structure is also intended to hold any return value which is associated with the actual function. After the structure is created in step 211, any parameters passed into the call to the stack checking function are copied into the structure. It should be appreciated that in some embodiments, the actual function and, hence, the stack-checking function, may not require any parameters to be passed into a call.

New, discontiguous stack space, i.e., stack chunks, to be used with the original stack chunk, is allocated in a step 213. One configuration for an interface between the original stack chunks and a new stack chunk will be described below with respect to FIG. 3. Typically, the amount of stack space allocated is dependent upon the amount of stack space that is likely to be required by the actual function. That is, stack space may be dynamically sized based upon the requirements of the actual function. In one embodiment, the new stack chunks which are allocated are obtained from a memory allocater, or a free list, of stack chunks which are unallocated. After the new stack space is allocated, a jump-back point for a "long jump" is set up in a step 214. As will be appreciated by those skilled in the art, a long jump is a jump from a call at one level of the stack to a call at a deeper level of the stack. A jump-back point is a point associated with one stack chunk, e.g., the original stack with which the actual function is associated, to which a return to the stack chunk may be made from a new stack chunk. The jump-back point is generally placed in a thread-specific, or thread-private, data structure, as will be appreciated by those of ordinary skill in the art. It should be appreciated that although not all call chains will require a jump-back point, the jump-back point is typically created in the event that it will be needed.

After the jump-back point is created in step 214, a call is made to the actual function on the new stack in a step 216. In general, once the call is made to the actual function, any return value from the call is copied into the structure which was created in step 211. The steps associated with calling the actual function on the new stack will be described below with respect to FIG. 4. From step 216, process flow proceeds to a step 218, shown in FIG. 2b, in which a determination is made regarding whether a long jump to the original stack chunk occurred when the call to the actual function was made. If it is determined that a long jump to the original stack did occur, then, in a step 220, the unused stack chunks allocated above the original stack chunk are cleaned up using methods which are well known to those skilled in the art. After the stack chunks allocated above the original stack chunk are cleaned up, then, in a step 222, the stack chunks are returned to a memory allocater. Alternatively, the stack chunks can be returned to a free list. While a memory allocated for the free list can be reallocated to any suitable application, the free list is generally used to reallocate memory only for use in stack chunks. It should be appreciated that for a "lazy reclamation" scheme, or a selective clean up scheme in which all newly allocated stack chunks are not cleaned up, no clean up is necessarily done in this step.

From step 222, a jump is made to a user-created jump-back point, which is both stored and referenced in user-provided code, within a stack chunk that is appropriate to the actual function. That is, a jump is made to the frame within the stack chunk that contains the user-created jump-back point. Previously, a long jump was requested to the actual destination, as was determined in step 218. However, in order to enable stack chunks which are not in use, i.e., any stack chunks that were created in step 213 which do not include the actual destination, to be cleaned up, a long jump is made to detour from the actual destination to the jump-back point. After the unused stack chunks are cleaned up and returned to allocated memory, the jump is made to the actual destination. Then, the process of executing the actual function, which involves stack-checking, ends at 210.

If it is determined in step 218 that a long jump to the original stack did not occur, then the new stack chunks, as allocated in step 213, are cleaned up in a step 226. In some embodiments, all new stack chunks are cleaned up. In other embodiments, some stack chunks may not be cleaned up in anticipation of another function call which may require the stack chunks. The cleaned up stack chunks are returned to a memory allocater, a free list, or the like in a step 228. Once the stack chunks are returned, a return is made from the actual function to the stack-checking function in a step 230. Finally, in a step 232, any return value of the actual function is copied from the structure that was created in step 211. Then, the process of executing an actual function, which involves stack-checking, is completed at 210.

Figure 3:
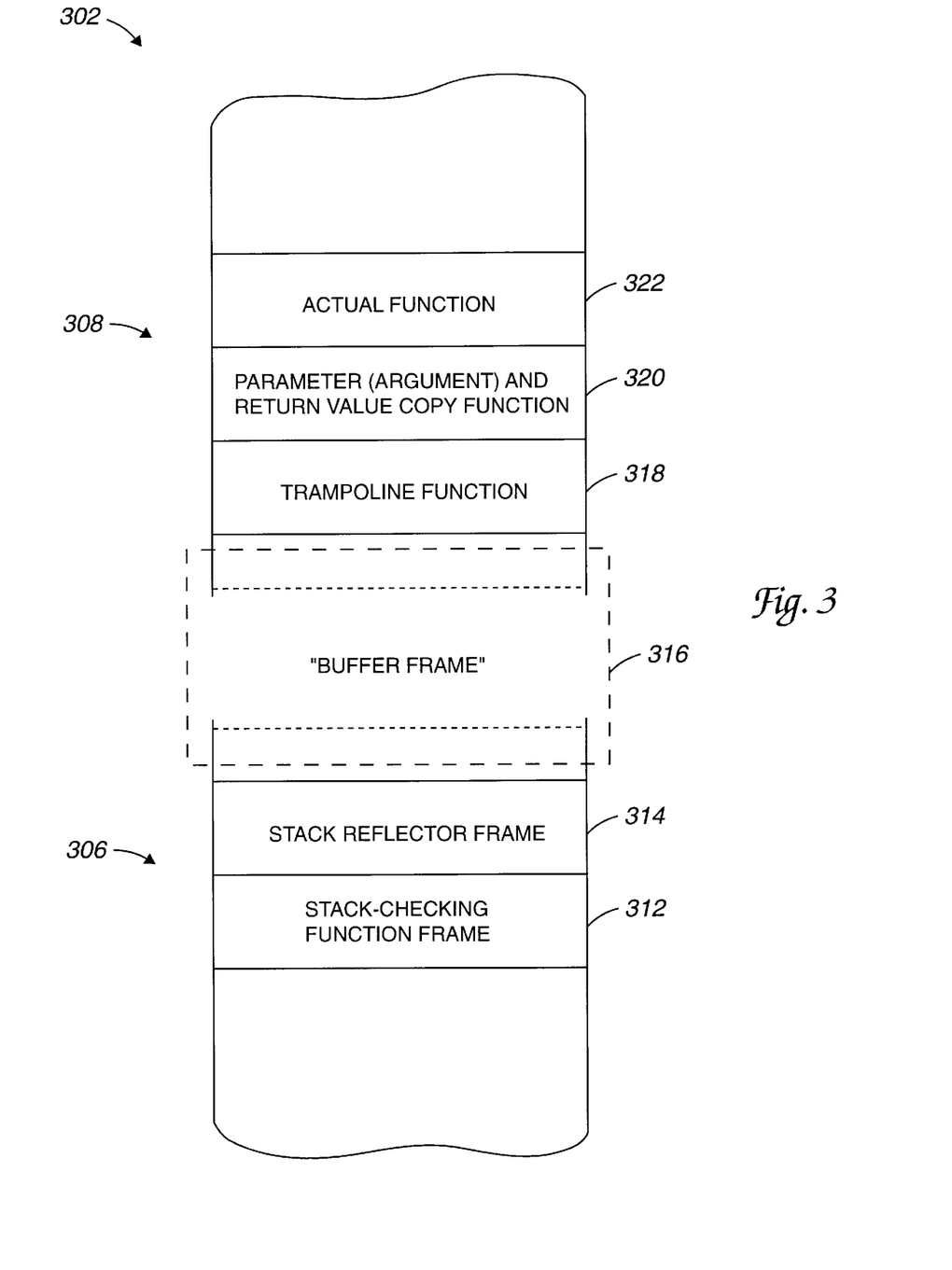
FIG. 3 is a diagrammatic representation of a non-contiguous computer stack which includes a "buffer" frame in accordance with an embodiment of the present invention.

The original stack and a new stack with which the original stack is associated may have any suitable configuration. One suitable configuration is shown in FIG. 3, which is a diagrammatic representation of a non-contiguous computer stack in accordance with an embodiment of the present invention. Computer stack 302 comprises an original stack chunk 306 and a new stack chunk 308. It should be appreciated that although stack 302 is shown as being comprised of two discontiguous portions, namely original stack 310 and new stack 320, stack 302 may be comprised of any number of discontiguous portions.

Original stack chunk 306 includes a stack-checking function frame 312 which holds local variables, i.e., variables which are local to original stack chunk 306, which are used by the stack-checking function. As described above with respect to FIG. 2, the stack-checking function is generally used to determine whether a stack overflow has occurred or appears to be imminent. The stack-checking function accesses a "stack reflector" function that generally contains code used to allocate stack space and perform a clean up of stack chunks which are not in use. Local variables used by the stack reflector function are contained in stack reflector frame 314.

It should be appreciated that in the described embodiment, variables contained within stack reflector frame 314 include variables used to lock a "stack checking lock," which is a lock that temporarily prevents other threads from accessing the stack with which the lock is associated, while pointers are moving between original stack chunk 306 and new stack chunk 308. One pointer which is moved between original stack chunk 306 and new stack chunk 308 is generally known as a current stack chunk pointer. The current stack chunk pointer generally keeps track of the stack which is in use, as for example stack 302. A frame pointer associated with a stack chunk, as for example new stack chunk 308, identifies the location of the current frame of new stack chunk 308 which is in use. In embodiments which include a frame pointer for each stack chunk, for a stack chunk which is not in use the frame pointer associated with that stack chunk "points to," or identifies, the "top" frame of the stack chunk, or the frame of the stack chunk which was most recently used. Further, each frame includes a frame stack pointer which saves the most recent location of the current stack pointer within the frame.

It should be appreciated that for embodiments in which several stack chunks are included, a stack chunk context structure may be used in order to identify stack chunks that are part of an overall stack which includes the stack chunk that is currently in use. This stack chunk context structure identifies stack chunks which were previously pointed to by the current stack chunk pointer. The points to which long jumps are made may also be identified in the stack chunk context structure.

The stack protection lock, which may be any suitable lock, as for example a scheduler lock, serves the purpose of preventing other threads from accessing new stack chunk 308 and stack chunk 306 while the current stack chunk pointer is being moved between original stack chunk 306 and new stack chunk 308. For embodiments in which the lock is a scheduler lock, multi-threaded execution is prevented for short periods of time.

As the stack reflector function allocates stack chunks, the stack reflector function may allocate a non-contiguous stack chunk, as for example new stack chunk 308. While new stack chunk 308 and original stack chunk 306 are discontiguous in real memory, a buffer frame 316 serves as a functional linkage between new stack chunk 308 and original stack chunk 306. That is, buffer frame 316 basically makes the boundary between new stack chunk 308 and original stack chunk 306 transparent. A buffer frame function that is associated with buffer frame 316 invokes a function that is executing on the new stack chunk 308. This buffer frame function enables the actual function to execute with a hidden discontinuity between the current stack pointer and a previous frame stack pointer. Further, the actual function may execute with no distinction made between non-contiguous stacks 306, 308. The process of invoking new stack chunk 308 includes moving the stack pointer from original stack chunk 306 to new stack chunk 308 and moving the frame pointer associated with new stack chunk 308 to buffer frame 316.

A "trampoline" function, which is associated with trampoline function frame 318, is invoked by the buffer frame function to release the scheduler lock to enable the actual function, which is associated with actual function frame 322, to be invoked. The trampoline function generally continues the work of the stack reflector function. As described above with respect to FIG. 2, arguments may be passed to the actual function using a data, or memory, structure. The data structure serves as a transport for any arguments to the actual function and any return value that results from a call to the actual function.

In general, the trampoline function includes a prologue and an epilogue. Although the prologue may contain any code, in the described embodiment, the prologue contains "locking code," or the code which is used to lock the stack protection lock. Similarly, while the epilogue may also contain any code, in the described embodiment, the epilogue contains code which is used to unlock the stack protection lock.

In the described embodiment, once the trampoline function executes the prologue code which may unlock the stack protection lock, an argument and return value copy function, which uses local variables contained in argument and return value copy function frame 320, is called to copy arguments, or parameters, into the call to the actual function. The actual function is associated with actual function frame 322. It should be appreciated that in some embodiments, the trampoline function and the argument and return value copy function may be comprise a single function.

Once the actual function is called, if the call generates a return value, the return value is copied into the data structure, as previously described. After the return value is copied, process control returns to the trampoline function to execute epilogue code, which may include commands to re-lock the stack-protection lock. Eventually, the return value is returned to the stack-checking function via the previously mentioned data structure.

Figure 4:
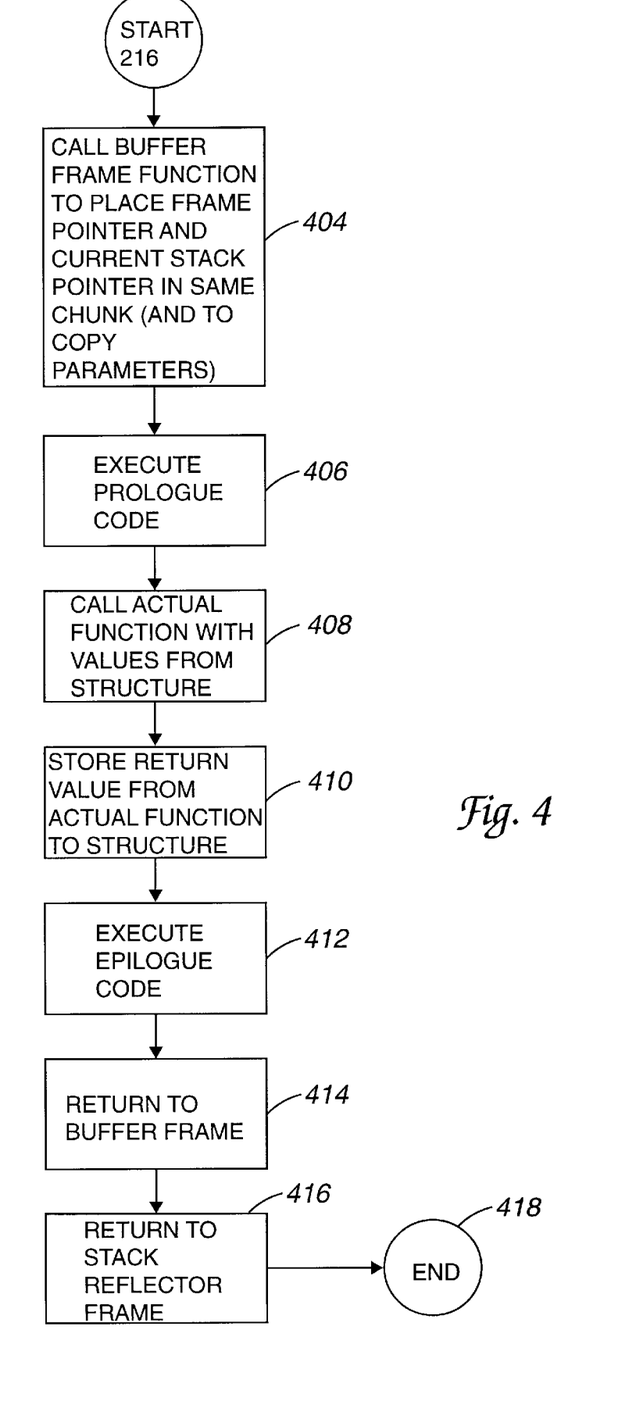
FIG. 4 is a process flow diagram which illustrates the steps associated with calling a stack-checking function in accordance with an embodiment of the present invention.

Referring next to FIG. 4, the steps associated with calling an actual function on a new stack will be described in accordance with an embodiment of the present invention. In other words, step 216 of FIG. 2 will be described. In a step 404, a buffer frame function, which was previously described, is called in order to place a frame pointer and the current stack pointer in the same new stack chunk. The buffer frame function is further used to copy any arguments associated with the actual function to the new stack chunk. The call to the buffer frame function is generally made by the stack-checking function, or by a function that is called by the buffer frame function, as for example a stack reflector function.

After the buffer frame function is called, prologue code that needs to execute on the new stack chunk, is executed in a step 406. It should be appreciated that the prologue code may include commands to release, or unlock, a stack protection lock. In some embodiments, the stack protection lock may be locked using a stack reflector function, and unlocked using a trampoline function. The stack protection lock, as described above, generally serves to prevent programs, or threads, other than the current program, or thread, from accessing the stack. In order for other threads to execute and to examine the current stack pointer, the stack protection lock must be unlocked in step 406.

In a step 408, the actual function is executed using parameter values held in the data structure created for this purpose. That is, parameter values stored in the data structure created in step 211 of FIG. 2 are used in the call to the actual function. In some embodiments, the execution of prologue code, associated with a trampoline function, may be required prior to the execution of the actual function, and the execution of epilogue code may be required prior to a return to the buffer frame. That is, the execution of the actual function may be interposed with a call to a trampoline function. After the actual function executes, any return value which results from the execution of the actual function is written in the data structure in a step 410. In some embodiments, the actual function will not return a value, in which case no return value is stored in the data structure.

From step 410, process control proceeds to a step 412 in which epilogue code, generally associated with a trampoline function, for the new stack chunk is executed. In the described embodiment, the epilogue code includes commands to re-lock the stack protection lock. After the epilogue code is executed, a return is made to the buffer frame in a step 414. Then, in a step 416, a return is made to the stack reflector frame. As previously described, code associated with the stack reflector frame includes code used to clean up stacks. After the return to the stack reflector frame, the process of calling the actual function on the new stack ends at 418.

Figure 5:
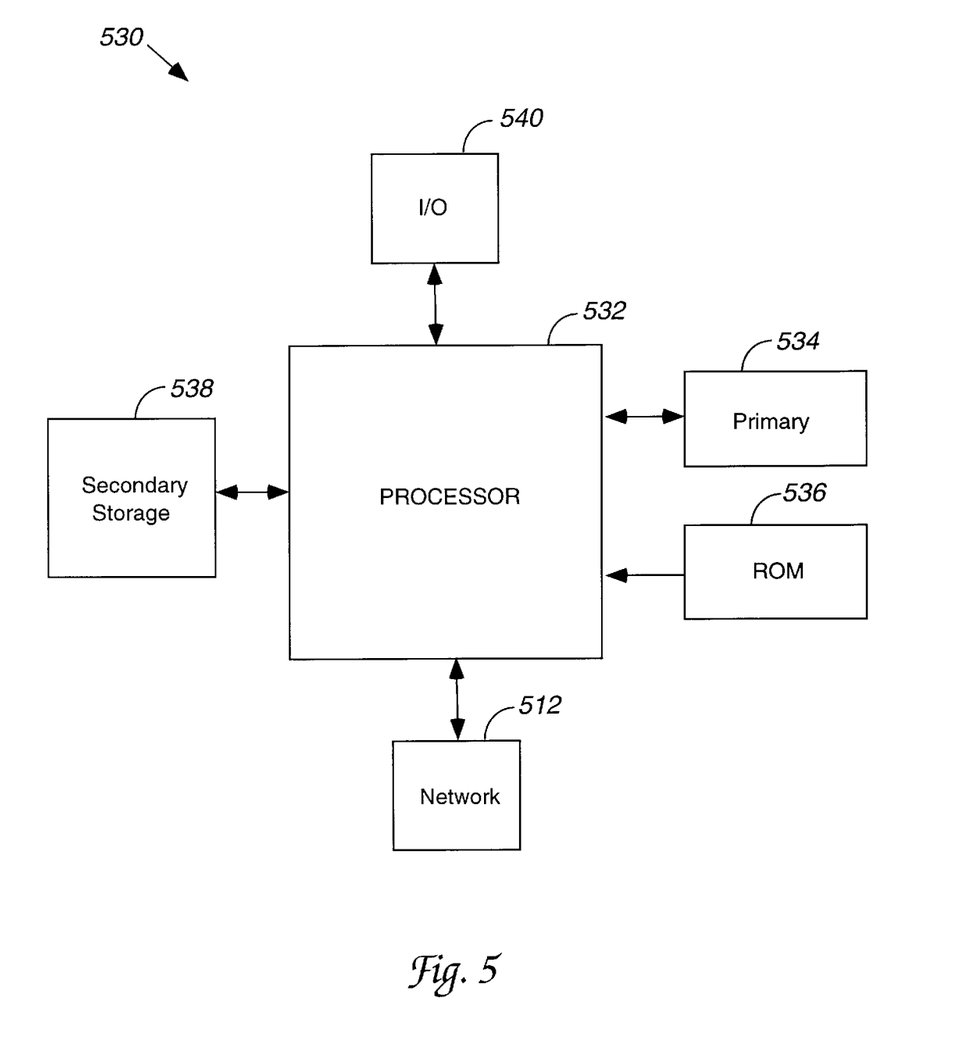
FIG. 5 is a diagrammatic representation of a typical computer system in accordance with an embodiment of the present invention.

FIG. 5 illustrates a typical computer system in accordance with the present invention. The computer system 530 includes any number of processors 532 (also referred to as central processing units, or CPUs) that is coupled to memory devices including primary storage devices 534 (typically a read only memory, or ROM) and primary storage devices 536 (typically a random access memory, or RAM) on which stacks are generally found. As is well known in the art, ROM 534 acts to transfer data and instructions uni-directionally to the CPU and RAM 536 is used typically to transfer data and instructions in a bi-directional manner. Both primary storage devices 534, 536 may include any suitable computer-readable media as described above. A mass memory device 538 is also coupled bi-directionally to CPU 532 and provides additional data storage capacity. The mass memory device 538 may be used to store programs, data and the like and is typically a secondary storage medium such as a hard disk that is slower than primary storage devices 534, 536. Mass memory storage device 538 may take the form of a magnetic or paper tape reader or some other well-known device. It will be appreciated that the information retained within the mass memory device 538, may, in appropriate cases, be incorporated in standard fashion as part of RAM 536 as virtual memory. A specific mass storage device such as a CD-ROM 534 may also pass data uni-directionally to the CPU.

CPU 532 is also coupled to one or more input/output devices 540 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 532 optionally may be coupled to a computer or telecommunications network, e.g., an Internet network or an intranet network, using a network connection as shown generally at 512. With such a network connection, it is contemplated that the CPU might receive information from the network, or might output information to the network in the course of performing the above-described method steps. The above-described devices and materials will be familiar to those of skill in the computer hardware and software arts.

Thus, the present invention will be seen to provide an efficient method of allocating memory in a computer system without the effort and expense of designing new compilers and recompiling existing software. Using the software, methods, and apparatus described herein, stack overflow conditions can be evaluated, and new memory stack chunks reallocated if necessary, to prevent memory allocation errors from occurring. This can be done using wrapped stack checking that obviates the need for redesigning existing compilers and recompiling existing software.

Although only a few embodiments of the present invention have been described, it should be understood that the present invention may be embodied in many other specific forms without departing from the spirit or the scope of the present invention. By way of example, the steps associated with executing a function which requires the ability to determine the availability of stack space may be widely varied. Steps may also be removed or added without departing from the spirit or the scope of the present invention. Further, the process of cleaning up stack chunks which are not in use may be selective, rather than all-encompassing. By way of example, rather than cleaning up all stack chunks which are not in use, certain stack chunks may be cleaned up, while others may be left allocated in anticipation of future functions, without departing from the spirit of the scope of the present invention. Therefore, the described embodiments should be taken as illustrative and not restrictive, and the invention should be defined by the following claims and their full scope of equivalents.

We claim:

1. A method for allocating additional computer memory stack space for executing a compiled function, which compiled function is located in a first computer memory stack chunk, the method comprising the steps of:

a) calling a stack checking function, said stack checking function including said compiled function, the stack checking function being arranged to check the amount of computer memory stack space that is available;

b) determining when additional computer memory stack space will be required for executing said compiled function;

c) calling said compiled function when it is determined that no additional computer memory stack space is required to execute said compiled function; and d) allocating said additional computer memory stack space for executing said compiled function when it is determined that said additional computer memory stack space is required to execute said compiled function, wherein said additional computer memory stack space is not contiguous with said first computer memory stack chunk.

2. The method of claim 1, wherein said step of allocating said additional computer memory stack space includes allocating a second stack chunk for said compiled function.

3. The method of claim 1, further including the step of setting a jump-back point for a long jump operation.

4. The method of claim 3, further including the step of determining whether a long-jump occurred.

5. The method of claim 4, further including the steps of cleaning-up stack chunks allocated above said first stack chunk that are not in use, and returning said stack chunks above said first stack chunk that are not in use to a memory allocater, if it is determined that a long-jump occurred.

6. The method as recited in claim 1 further including the step of releasing a stack protection lock associated with said second stack chunk.

7. The method as recited in claim 6 further including the step of locking said stack protection lock.

8. The method as recited in claim 1 further including executing said compiled function on said second stack chunk.

9. A method for allocating additional computer memory stack space for executing a compiled function, the compiled function being located in a first computer memory stack chunk, the method comprising:

calling a stack checking function, said stack checking function including said compiled function;

determining when additional computer memory stack space will be required for executing said compiled function;

calling said compiled function when it is determined that no additional computer memory stack space is required to execute said compiled function;

allocating said additional computer memory stack space for executing said compiled function when it is determined that said additional computer memory stack space is required to execute said compiled function, said additional computer memory stack space being not contiguous with said first stack chunk, wherein allocating said additional computer memory stack space includes allocating a second stack chunk;

calling a buffer frame function, said buffer frame function configured to create a transparent boundary between said first stack chunk and said second stack chunk;

calling a trampoline function, said trampoline function configured to call said compiled function using said second stack chunk; and executing said compiled function on said second stack chunk.

10. The method of claim 9, further including the step of releasing a stack protection lock associated with said second stack chunk.

11. The method of claim 10, further including the step of locking said stack protection lock.

12. A computer-readable medium containing computer-readable program code devices for allocating additional computer memory stack space for executing a compiled function, which compiled function is located in a first computer memory stack chunk, said computer-readable medium comprising computer program code devices configured to cause a computer to execute the steps of:

a) calling a stack checking function, said stack checking function including said compiled function, wherein said stack checking function is arranged to check the amount of computer memory stack space available;

b) determining when additional computer memory stack space will be required for executing said compiled function;

c) calling said compiled function when it is determined that no additional computer memory stack space is required to execute said compiled function; and d) allocating said additional computer memory stack space for executing said compiled function when it is determined that said additional computer memory stack space is required to execute said compiled function, wherein said additional computer memory stack space is not contiguous with said first stack chunk.

13. The computer-readable medium of claim 12, wherein said program code devices are configured to cause a computer to allocate said additional computer memory stack space include program code devices for allocating a second stack chunk for said compiled function.

14. The computer-readable medium of claim 12, wherein said program code devices are configured to cause a computer to execute setting a jump-back point for a long jump operation.

15. The computer-readable medium of claim 14, wherein said program code devices are configured to cause a computer to execute determining whether a long-jump occurred.

16. The computer-readable medium of claim 15, wherein said program code devices are configured to cause a computer to execute cleaning-up stack chunks allocated above said first stack chunk that are not in use, and returning said stack chunks above said first stack chunk that are not in use to a memory allocater, if it is determined that a long-jump occurred.

17. A computer-readable medium containing computer-readable program code devices for allocating additional computer memory stack space for executing a compiled function, the compiled function being located in a first computer memory stack chunk, the computer-readable medium comprising computer program code devices configured to cause a computer to execute the steps of:

calling a stack checking function, said stack checking function including said compiled function;

determining when additional computer memory stack space will be required for executing said compiled function;

calling said compiled function when it is determined that no additional computer memory stack space is required to execute said compile function;

allocating said additional computer memory stack space for executing said compiled function when it is determined that said additional computer memory stack space is required to execute said compiled function, wherein said additional computer memory stack space is not contiguous with said first stack chunk, said additional computer memory stack space including a second stack chunk;

calling a buffer frame function, said buffer frame function configured to create a transparent boundary between said first stack chunk and said second stack chunk;

calling a trampoline function, said trampoline function configured to call said compiled function using said second stack chunk; and executing said compiled function on said second stack chunk.

18. The computer-readable medium of claim 17, wherein said program code devices are configured to cause a computer to execute releasing a stack protection lock associated with said second stack chunk.

19. The computer-readable medium of claim 18, wherein said program code devices are configured to cause a computer to execute locking said stack protection lock.

20. A computer system configured to allocate additional computer memory stack space for executing a compiled function, which compiled function is located in a first computer memory stack chunk, said computer system comprising:

a) computer memory configured to store the compiled function for execution, said computer memory being further configured to be arranged into at least one memory stack space having at least one memory stack chunk;

b) a stack checking function generator that is effective to wrap said compiled function to form a stack checking function; and c) a memory manager that is effective to execute said stack checking function and determine if additional memory is required to execute said compiled function.

21. The computer system of claim 20, wherein said memory manager is configured to allocate a second stack chunk if said memory manager determines that additional memory is required for executing said compiled function.

22. The computer system of claim 21, wherein said memory manager is adapted to create a buffer frame in said memory stack space, said buffer frame being adapted to create a transparent boundary between said first stack chunk and said second stack chunk.

23. The computer system of claim 22, wherein said memory manager is adapted to clean-up stack chunks allocated above said first stack chunk that are not in use, and return said stack chunks above said first stack chunk that are not in use for reallocation, if it is determined that a long-jump occurred.

24. The computer system as recited in claim 21 wherein said compiled function is arranged to execute on said second stack chunk.

* * * * *